(12) United States Patent
Zhou et al.

(10) Patent No.: US 9,647,732 B2
(45) Date of Patent: May 9, 2017

(54) LATTICE-REDUCTION-AIDED K-BEST ALGORITHM FOR LOW COMPLEXITY AND HIGH PERFORMANCE COMMUNICATIONS

(71) Applicant: Georgia Tech Research Corporation, Atlanta, GA (US)

(72) Inventors: Qi Zhou, Atlanta, GA (US); Xiaoli Ma, Norcross, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/030,034

(22) PCT Filed: Oct. 17, 2014

(86) PCT No.: PCT/US2014/061094
§ 371 (c)(1),
(2) Date: Apr. 15, 2016

(87) PCT Pub. No.: WO2015/058063
PCT Pub. Date: Apr. 23, 2015

(65) Prior Publication Data
US 2016/0233930 A1  Aug. 11, 2016

Related U.S. Application Data

(60) Provisional application No. 61/892,011, filed on Oct. 17, 2013, provisional application No. 61/909,429, filed on Nov. 27, 2013.

(51) Int. Cl.
*H04B 7/02* (2017.01)
*H04B 7/0413* (2017.01)
(Continued)

(52) U.S. Cl.
CPC ..... *H04B 7/0413* (2013.01); *H04L 25/03242* (2013.01); *H04L 25/03891* (2013.01); *H04L 27/38* (2013.01)

(58) Field of Classification Search
CPC ......... H04L 25/03891; H04L 25/03242; H04L 27/38; H04B 7/0413
(Continued)

(56) References Cited

U.S. PATENT DOCUMENTS 7,782,971 B2 * 8/2010 Burg ................. H04L 1/0656
375/267
9,059,828 B1 * 6/2015 Duarte ................. H04L 1/0054
(Continued)

FOREIGN PATENT DOCUMENTS

EP          2525537 B1     5/2011

OTHER PUBLICATIONS

Zhou, et al., "An Improved LR-aided K best Algorithm for MIMO Detection," IEEE International Conference, Apr. 3, 2013.
(Continued)

*Primary Examiner* — Daniel Washburn
*Assistant Examiner* — Fitwi Hailegiorgis
(74) *Attorney, Agent, or Firm* — Troutman Sanders LLP; Ryan A. Schneider; Dan Li

(57) ABSTRACT

Systems and methods are disclosed for detecting a symbol in large-scale multiple-input multiple-output communication systems. The detection is based on an improved lattice-reduction-aided K-best algorithm. The detection finds K best candidate symbols with minimum costs for each layer based on a priority queue and an on-demand expansion. In a complex domain, the detection may include a 2-dimensional Schnorr-Euchner expansion or, in the alternative, a two-stage 1-dimensional Schnorr-Euchner expansion.

10 Claims, 8 Drawing Sheets

(51) Int. Cl.
*H04L 27/38* (2006.01)
*H04L 25/03* (2006.01)

(58) Field of Classification Search
USPC .......................................... 375/341, 261, 267
See application file for complete search history.

(56) References Cited

U.S. PATENT DOCUMENTS

| | | | |
|---|---|---|---|
| 2008/0279298 A1* | 11/2008 | Ben-Yishai | H04L 25/03242 |
| | | | 375/261 |
| 2009/0232241 A1* | 9/2009 | Shabany | H04B 7/0413 |
| | | | 375/262 |
| 2013/0022155 A2 | 1/2013 | Zhou | |
| 2014/0185716 A1* | 7/2014 | Aubert | H04L 25/03216 |
| | | | 375/341 |

OTHER PUBLICATIONS

International Search Report and Written Opinion for the priority PCT Application No. PCT/US14/061094, dated Jan. 21, 2015.

* cited by examiner

LATTICE-REDUCTION-AIDED K-BEST ALGORITHM FOR LOW COMPLEXITY AND HIGH PERFORMANCE COMMUNICATIONS

CROSS-REFERENCE TO RELATED APPLICATIONS

This application is a U.S. National Phase Application based on Skip to Main Content PCT/US14/61094, filed 17 Oct. 2014, which claims the benefit of U.S. Provisional Pat. Application Ser. No. 61/892,011, entitled "Lattice-Reduction-Aided K-Best Algorithm for Low Complexity and High Performance Communications," filed on 17 Oct. 2013, and U.S. Provisional Patent Application Ser. No. 61/909,429, entitled "Schnorr-Euchner Expansion Methods," filed on 27 Nov. 2013, all of which are incorporated herein by reference in their entirety as if fully set forth below.

TECHNICAL FIELD

Embodiments of the disclosed technology generally relate to signal processing in multiple-input multiple-output ("MIMO") signal transmission detection. More particular, the disclosed technology relates to improved implementations of lattice-reduction-aided K-best algorithms in MIMO communications.

BACKGROUND

Large-scale multi-input multi-output (MIMO) systems are attractive due to their high capacity and bandwidth efficiency. By transmitting and receiving signals via tens or hundreds of antennas, large-scale MIMO systems show great potential for next generation wireless communications, for example, to obtain high spectral efficiencies. However, a critical challenge in the design of large-scale MIMO systems is to provide high performance, high throughput, and low latency, while reducing the complexity of the detectors. Despite its optimal error performance, maximum likelihood detectors (MLD) require prohibitively high complexity, especially when the number of antennas is large.

Sphere decoding algorithm (SDA) is an MLD with less complexity, but the complexity of the SDA is still exponential in terms of problem size. To address the stringent needs of large-scale MIMO detection, several detectors for large-scale MIMO systems have been proposed.

For example, local neighborhood search methods are developed to obtain near-optimal performance for large-scale MIMO systems, but their complexity depends on symbol, noise, and channel realizations and their worst-case complexity can be extremely high. Iterative soft interference cancellation detectors have fixed complexity; however, the complexity is still high if the number of iterations is large. Furthermore, when the constellation size is large, the detector cannot collect full diversity as the MLD, thus suffering from inferior performance.

In contrast, linear detectors (LDs) and successive interference cancellation (SIC) detectors require polynomial complexity but suffer from significantly degraded error performance Recently, to improve the error performance of LDs and SIC detectors, lattice reduction (LR)-aided detection has been proposed. LR-aided LDs can achieve the same diversity as the MLD. In addition, different from the search-based detectors described, the instantaneous complexity of LR-aided detector does not depend on symbol and noise realizations, which is preferred for hardware implementation.

Although significant performance improvement for LR-aided LDs and SIC detectors is found, the LR-aided detectors still exhibit some performance loss to the MLD. In addition, as the number of antennas increases, the gap between the LR-aided detectors and the MLD increases significantly.

To further bridge the gap, LR-aided K-best detectors are proposed. Among existing MIMO detectors, LR-aided K-best detectors are attractive for their low complexity and (near-) optimal performance. However, compared to the conventional K-best detectors, the LR-aided K-best detector has no boundary information about the symbols in the lattice-reduced domain.

The loss of boundary information results in two new issues of LR-aided K-best detector relative to the conventional K-best: i) the range of the symbols is broader and undetermined and; ii) the possible children for each layer can be infinite. To find the K best partial candidates from the infinite children set, an algorithm is proposed to replace the infinite set with a finite subset of the children. See X. Qi and K. Holt, "A lattice-reduction-aided soft demapper for high-rate coded MEMO-OFDM systems," *IEEE Signal Process. Lett.*, vol. 14, no. 5, pp. 305-308, May 2007 (hereinafter "Qi"). To reduce the complexity of generating the subset, an on-demand child expansion based on the Schnorr-Euchner (SE) strategy is also proposed. See M. Shabany and P. Glenn Gulak, "The application of lattice-reduction to the K-Best algorithm for near-optimal MIMO detection," in *IEEE Int. Symp. on Circuits and Systems* (ISCAS), May 2008, pp. 316-319 (hereinafter "Shabany").

Nevertheless, the existing LR-aided K-best detectors still face several challenges in hardware implementation in terms of latency, throughput, and complexity. Most existing LR-aided K-best detectors consider real equivalent signal model of the complex model. For example, existing LR-aided K-best detectors may result in long latency and high hardware resources. On the other hand, the complex LR-aided K-best detectors may yield shorter latency and lower resources, but existing complex LR-aided K-best designs are complicated and may not be easy to implement in hardware. Further, the critical path of some existing K-best detectors is determined by the SE expansion, which may lower the maximum frequency and thus system throughput. Furthermore, the existing LR-aided K-best algorithm has a high complexity on the order of $O(N_t^2 K+N_t K^2)$, where $N_t$ is the number of transmit antennas and K is the number of candidates.

Based on the foregoing, there is a need for a less complex LR-aided K-best detector with low latency, high throughput and high performance.

BRIEF SUMMARY

The disclosed technology relates to improvements of a LR-aided K-best detector for large-scale MIMO systems and its hardware implementation. The LR-aided K-best algorithm described herein may achieve near-optimal bit-error rate performance to the MLD with lower complexity than the existing LR-aided K-best algorithms.

One aspect of the disclosed technology relates to a multiple-input multiple-output communication system. The system may include a plurality of antennas configured to receive a plurality of wireless signals. The system may include a symbol detector. The symbol detector may be configured to convert the received wireless signals to input signals. The symbol detector may implement an LR-aided K-best algorithm to detect a symbol in the input signals. For example, the symbol detector may conduct a search of a plurality of layers of candidate symbols. The symbol detector may implement a priority queue to identify K-best candidate symbols for each of the plurality of layers. The priority queue may be updated based on an expansion of at least one candidate symbol.

Another aspect of the disclosed technology relates to a method for symbol detection in a multiple-input multiple-output communication system. A plurality of antennas may receive a plurality of wireless signals. Each wireless signal may include a symbol. The method may convert the received plurality of wireless signals to corresponding input signals. A processor may conduct a search of a plurality of layers of candidate symbols in the input signals based on an LR-aided K-best algorithm. A priority queue may be implemented to identify K-best candidate symbols for each layer. The priority queue may be updated based on an expansion of at least one candidate symbol. The method may output at least one symbol.

These and other aspects of the disclosed technology are described in the Detailed Description disclosed below and the accompanying figures. Other aspects and features of embodiments of the disclosed technology will become apparent to those of ordinary skill in the art upon reviewing the following description of specific, exemplary embodiments of the disclosed technology in concert with the figures. While features of the disclosed technology may be discussed relative to certain embodiments and figures, all embodiments of the disclosed technology can include one or more of the features discussed herein. While one or more embodiments may be discussed as having certain advantageous features, one or more of such features may also be used with the various embodiments of the disclosed technology discussed herein. In similar fashion, while exemplary embodiments may be discussed below as system or method embodiments, it is to be understood that such exemplary embodiments may be implemented in various devices, systems, and methods of the disclosed technology.

DESCRIPTION OF THE DRAWINGS

The following detailed description of the disclosed technology may be better understood when read in conjunction with the appended drawings. The drawings illustrate exemplary embodiments, but the subject matter is not limited to the specific elements and instrumentalities disclosed.

DETAILED DESCRIPTION

Figure 1:
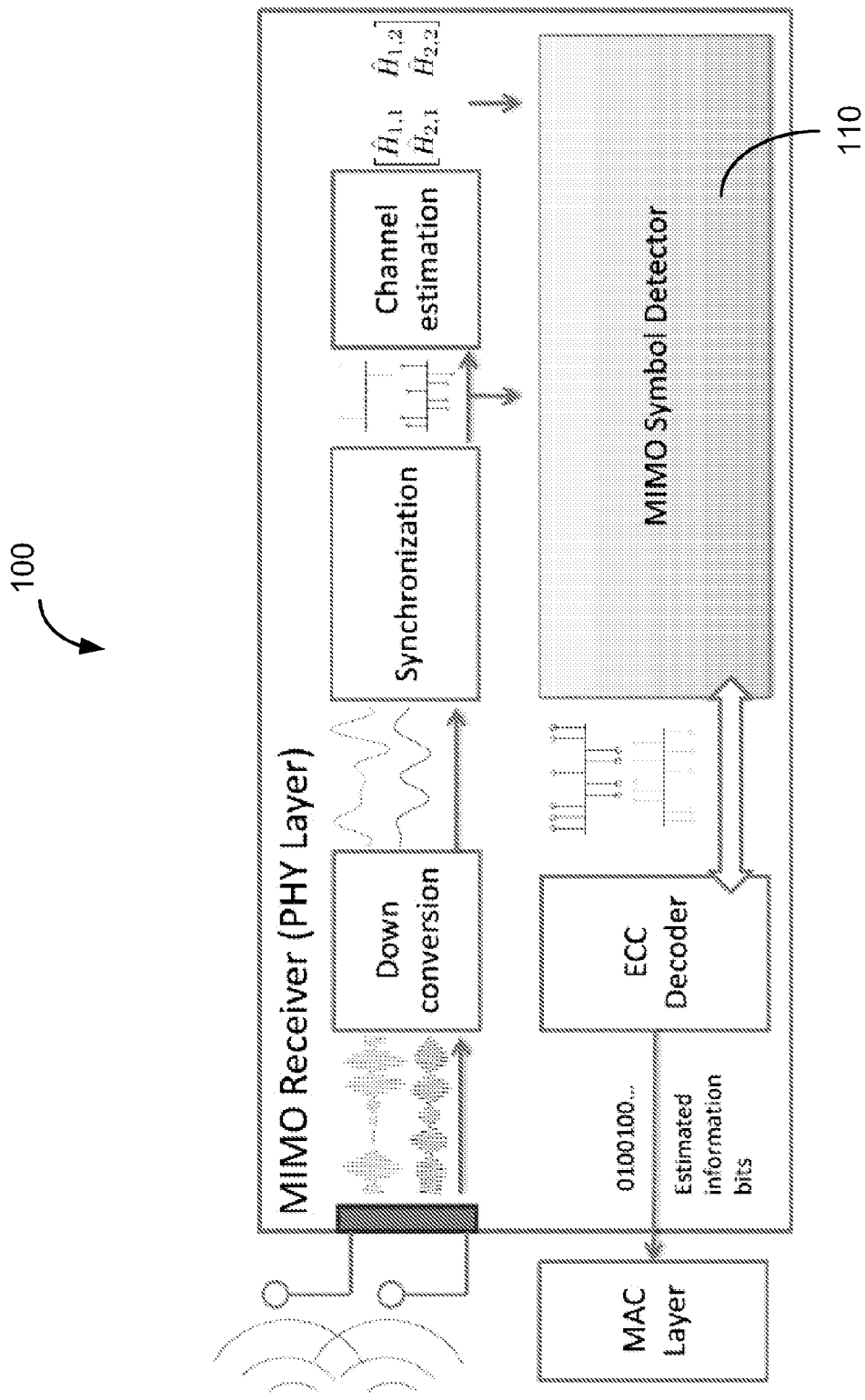
FIG. 1 illustrates an overall structure of a MIMO receiver.

To facilitate an understanding of the principles and features of the disclosed technology, various illustrative embodiments are explained below. In particular, the disclosed technology is described in the context of systems and methods for MIMO communication systems. Certain embodiments of the disclosed technology may be applied to many wireless MIMO communication system standards known in the art, including, but not limited to, IEEE 802.11ax (Wi-Fi), 4G, 3GPP, Long Term Evolution Advanced (LTE-A), Wi-MAX, HSPA+, and the like. Embodiments of the disclosed technology, however, are not limited to use in wireless MIMO communication systems. Rather, embodiments of the disclosed technology can be used for processing other MIMO communication systems, including, but not limited to, optical (MIMO) systems or other transmission systems having an architecture incorporating multiple transmitters and/or multiple transceivers. Further, embodiments of the disclosed technology may be applied to generalized signal carrier frequency division multiple access (GSC-f DMA) systems, as well as precoded FDMA (P-FDMA) systems.

The components described hereinafter as making up various elements of the disclosed technology are intended to be illustrative and not restrictive. Many suitable components or steps that would perform the same or similar functions as the components or steps described herein are intended to be embraced within the scope of the disclosed technology. Such other components or steps not described herein can include, but are not limited to, for example, similar components or steps that are developed after development of the disclosed technology.

A short description of the notation used herein is as follows. Superscript $^T$ denotes the transpose. The real and imaginary parts of a complex number are denoted as $R[\bullet]$ and $I[\bullet]$. Upper- and lower-case boldface letters indicate matrices and column vectors, respectively. $A_{i,k}$ indicates the (i, k)th entry of matrix A. $I_N$ denotes the N×N identity matrix, $0_{N \times L}$, is the N×L matrix with all entries zero, and $1_{N \times L}$, is the N×L matrix with all entries one. Z is the integer set. Z[j] is the Gaussian integer set having the form Z+Zj, and $j = \sqrt{-1}$. $E\{\bullet\}$ denotes the statistical expectation. $\|\bullet\|$ denotes the 2-norm.

A transmission of a MIMO system with $N_t$ transmit antennas and $N_r$ receive antennas may be represented in the following mathematical formula $$y^c = H^c s^c + w^c, \qquad (1)$$

where $s^c = [s_1^c, s_2^c, \ldots, s_{N_t}^c]^T$, $(s_i^c \in S^c)$ may be the complex information symbol vector with $S^c$ being a constellation set of quadrature amplitude modulation (QAM), $H^c$ may be an $N_r \times N_t (N_r \geq N_t)$ complex channel matrix, $y^c = [y_1^c, y_2^c, \ldots, y_{N_r}^c]^T$ may be the received signal vector, and $w^c = [w_1^c, w_2^c, \ldots, w_{N_r}^c]^T$ may be the complex additive white Gaussian noise (AWGN) vector with zero mean and covariance $N_0 I_{N_r}$.

FIG. 1 illustrates an example overall structure of a MIMO receiver 100. For purposes of illustration, noise at the receiver is removed. The MIMO receiver 100 may include a MIMO symbol detector 110 configured to perform recovery or detection of information symbol. For instance, given $H^c$ and $y^c$ of Eq. (1), the MIMO symbol detector 110 may perform recovery or detection of the information symbols s.

1. Conventional Detectors
1.1 Conventional Real LR-aided K-best Detector

Given the complex signal model in Eq. (1), an equivalent real signal model may be represented by the following formula:

$$\begin{bmatrix} \Re[y^c] \\ \Im[y^c] \end{bmatrix} = \begin{bmatrix} \Re[H^c] & -\Im[H^c] \\ \Im[H^c] & \Re[H^c] \end{bmatrix} \begin{bmatrix} \Re[s^c] \\ \Im[s^c] \end{bmatrix} + \begin{bmatrix} \Re[w^c] \\ \Im[w^c] \end{bmatrix} \quad (2)$$

$$y = Hs + w,$$

where $\Re[\cdot]$ and $\Im[\cdot]$ may denote the real and imaginary parts of a complex variable, respectively, $s=[s_1, s_2, \ldots, s_{2N}]^T$ with $s_i \in S$, and $S$ may represent the constellation set of PAM as $\{-\sqrt{M}+1, -\sqrt{M}+3, \ldots, \sqrt{M}-1\}$.

Given the model in Eq. (2), the MLD may be represented as $$\hat{s}^{ML} = \arg\min_{\tilde{s} \in S^{2N_t}} \|y - H\tilde{s}\|^2, \quad (3)$$

which is generally non-deterministic polynomial hard (NP-hard), and has high complexity. The LR-aided detection works for infinite lattice, and may be represented by the following relaxed problem:

$$\hat{s}^{ML} = \arg\min_{\tilde{s} \in \mathcal{U}^{2N_t}} \|y - H\tilde{s}\|^2, \quad (4)$$

where $\mathcal{U}$ may be the unconstrained constellation set as $\{\ldots, -3, -1, 1, 3, \ldots\}$. Since $\hat{s}$ may not be a valid QAM symbol, a quantization step may be applied"

$$\hat{s}^{NLD} = Q(\hat{s}), \quad (5)$$

where $Q(\cdot)$ may represent the symbol-wise quantizer to the constellation set $S$.

The unconstrained detection in Eq. (3) is naive lattice detection (NLD). The closest point search algorithm, e.g., sphere decoding algorithm, may find the optimal solution to formula (4). However, one issue of the NLD is that it is not diversity-multiplexing tradeoff (DMT) optimal in general, i.e., the NLD is suboptimal in terms of diversity. To achieve the DMT optimality, the regularized lattice decoding may be carried out:

$$\hat{s} = \arg\min_{\tilde{s} \in \mathcal{U}^{2N_t}} \|y - H\tilde{s}\|^2 + \frac{N_0}{2\sigma_s^2}\|\tilde{s}\|^2 \quad (6)$$

$$= \arg\min_{\tilde{s} \in \mathcal{U}^{2N_t}} \|\bar{y} - \bar{H}\tilde{s}\|^2$$

where the Minimum Mean Square Error (MMSE) regularization is adopted, $E\{ss^T\}=s^2I$, and $\bar{H}$ and $\bar{y}$ are the MMSE extended matrix and the extended received signal vector as:

$$\bar{H} = \begin{bmatrix} H \\ \sqrt{\frac{N_0}{2\sigma_s^2}} I_{2N_t} \end{bmatrix}, \bar{y} = \begin{bmatrix} y \\ 0_{2N_t \times 1} \end{bmatrix}. \quad (7)$$

To solve the NLD with MMSE in Eq. (6) with lower complexity, the LR-aided detection performs LR on the matrix $\bar{H}$ to obtain a more "orthogonal" matrix $\tilde{H}=\bar{H}T$, where $T$ is a unimodular matrix, such that all the entries of $T$ are integers, and the determinant of $T$ is $\pm 1$. Given $\tilde{H}$ and $T$, the NLD with MMSE becomes:

$$\hat{s} = 2T\arg\min_{\tilde{z} \in Z^{2N_t}} \|\breve{y} - \tilde{H}\tilde{z}\|^2 + 1_{2N_t \times 1}, \quad (8)$$

where $\breve{y}$ is the received signal vector after shifting and scaling as $(\bar{y}-\tilde{H}1_{2N_t \times 1})/2$ and $\tilde{s}=2T\tilde{z}+1_{2N_t \times 1}$. Since $\tilde{H}$ is more "orthogonal," the closest point search algorithm based on $\tilde{H}$ can enjoy much lower complexity compared to that based on $\bar{H}$ in Eq. (7). However, since the problem in Eq. (8) is NP-hard, the complexity of the closest point search is still considerably high when $N_t$ is large. To achieve low-complexity detection, the LR-aided MMSE-SIC detector finds a sub-optimal solution to (8) with degraded error performance.

The LR-aided K-best algorithm may enhance the performance of the LR-aided MMSE-SIC detector to find a "better" suboptimal solution to Eq. (8). See Qi and Shabany.

The LR-aided K-best algorithm may first perform QR decomposition on $\tilde{H}=QR$, where $Q$ is a $2(N_r+N_t) \times 2N_t$ orthonormal matrix and $R$ is a $2N_t \times 2N_t$ upper triangular matrix. Then, the problem in (8) may be reformulated as $$\hat{s} = 2T\arg\min_{\tilde{z} \in Z^{2N_t}} \|\breve{y} - R\tilde{z}\|^2 + 1_{2N_t \times 1}, \quad (9)$$

where $\breve{y}=Q^T\tilde{y}$, $\tilde{z}$ may be the candidates of the information symbols in the lattice-reduced domain with $\tilde{s}=2T\tilde{z}+1_{2N_t \times 1}$.

Next, the LR-aided K-best algorithm performs the breadth-first search from the $2N_t$th layer to the 1st layer. For each layer (e.g., the nth layer), the algorithm computes the K best partial candidates $[z_1^{(n)}, z_2^{(n)}, \ldots, z_K^{(n)}]$, i.e., the K partial candidates with the minimum costs among all the children of the K partial candidates $[z_1^{(n+1)}, z_2^{(n+1)}, \ldots, z_K^{(n+1)}]$ in the previous (n+1) st layer, where a partial candidate $z_i^{(n)}$ in the nth layer may be $[z_{i,n}^{(n)}, \ldots, z_{i,2N_t}^{(n)}]^T$. The cost associated with the partial candidate may be represented by the following formula:

$$cost_i^{(n)} = \sum_{\ell=n}^{2N_t} \left( \breve{y}_\ell - \sum_{k=\ell}^{2N_t} R_{\ell,k} z_{i,k}^{(n)} \right)^2, \quad (10)$$

A partial candidate of the nth layer $z_i^{(n)}$ may be called a child of a partial candidate of the (n+1)st layer $z_i^{(n+1)}$ if and only if $z_i^{(n)}=[z_{i,n}^{(n)}, (z_i^{(n+1)})^T]^T$, $z_{i,n}^{(n)} \in Z$ holds.

When the search of the 1st layer is completed, the LR-aided K-best outputs $\{z_k^{(1)}\}_{k=1}^K$ as k=1 the K estimates of the symbols in LR domain $\{\tilde{z}_k\}_{k=1}^K$. For uncoded case, the hard output of LR-aided K-best may be obtained as:

$$\hat{s} = \arg\min_{\tilde{s}_k = Q(2T\tilde{z}_k + 1_{2N_t \times 1})} \|\tilde{y} - H\tilde{s}_k\|^2 \quad (11)$$

For coded case, $\{\tilde{s}_k = Q(2T\hat{z}_k + 1_{2N_t \times 1})\}_{k=1}^{K}$ can be served as soft candidates to evaluate the approximate log-likelihood ratio of each coded bit.

Table 1 illustrates an example general description of a real LR-aided K-best detector. Note that only one partial candidate may be in the $(2N_t+1)$st layer, where $z_1^{(2N_t+1)}$ may represent the root node.

TABLE 1

A general description of real LR-aided K-best detectors.

Input: Channel matrix H, received signal vector y, candidate size K
Output: K symbol estimates $\{\hat{s}_k\}_{k=1}^{K}$
(1) Obtain $\overline{H}$ and $\overline{y}$
(2) $[\tilde{H}, T] = LR(\overline{H})$
(3) $[Q, R] = QR(\tilde{H})$
(4) $\check{y} = Q^T(\overline{y} - \overline{H}1_{2N_t \times 1})/2$
(5) $z_1^{(2N_t+1)} = [\ ], cost_1^{(2N_t+1)} = 0$, len = 1
(6) For n = $2N_t$ down to 1
(7) $[\{z_k^{(n)}\}_{k=1}^{K}, \{cost_k^{(n)}\}_{k=1}^{K}] =$
    Find_Kbest_Children $(\{z_k^{(n+1)}\}_{k=1}^{len}, \{cost_k^{(n+1)}\}_{k=1}^{len})$
(8) len = K
(9) End for
(10) Output $\hat{s}_k = Q(2Tz_k^{(1)} + 1_{2N_t \times 1})$ From Table 1, the key task of the LR-aided K-best algorithm is how to efficiently find the K best partial candidates of each nth layer from all the children of the partial candidates of the previous (n+1)st layer.

1.2 Conventional Complex LR-Aided K-Best Detector

Similar to the real LR-aided K-best detector described above, the complex LR-aided K-best detector may aim at finding the sub-optimal solution to the following problem:

$$\hat{s}^c = 2T^c \arg\min_{\tilde{z}^c \in Z[j]^{N_t}} \left\| \check{y}^c - R^c \tilde{z}^c \right\|^2 + (1+j)1_{N_t \times 1}. \quad (5)$$

where $j=\sqrt{-1}$, $\mathbb{Z}[j]$ may denote the Gaussian integer ring whose elements have a form $\mathbb{Z} + j\mathbb{Z}$, $T^c$ may be a complex unimodular matrix with determinant $\pm 1$ or $\pm j$ and all entries being Gaussian integers, $\overline{H}^c = \tilde{H}^c(T^c)^{-1}$, $\tilde{H}^c$ may be the LR-reduced channel matrix with $\tilde{H}^c = Q^c R^c$, $Q^c$ may be an orthonormal matrix, and $R^c$ may be an $N_t \times N_t$ upper triangular matrix with diagonal elements being real, $\check{y}^c = (Q^c)^H(\overline{y} - \overline{H}^c 1_{N_t \times 1}(1+j))/2$, and $\tilde{s}^c = 2T^c + (1+j)1_{N_t \times 1}$.

Table 2 provides an example procedure of the complex LR-aided K-best detector. The procedure in Table 2 may be similar to that of the real one illustrated in Table 1 except that all variables may be complex and the number of layers may be $N_t$. From Table 2, the main complexity of the LR-aided K-best algorithm may be to compute the K best partial candidates $[z_1^{(n)}, z_2^{(n)}, \ldots, z_K^{(n)}]$ for each nth layer, i.e., the K partial candidates with the minimum costs among all the children of the K partial candidates $[z_1^{(n+1)}, z_2^{(n+1)}, \ldots, z_K^{(n+1)}]$ in the previous (n+1) st layer, where a partial candidate $z_i^{(n)}$ in the nth layer may be $[z_{i,n}^{(n)}, \ldots, z_{i,N}^{(n)}]^T$. The cost of a complex partial candidate $z^c_i$ may be represented by the following formula:

$$cost_i^{(n)} = \sum_{\ell=n}^{N_t} \left| \check{y}_\ell - \sum_{k=\ell}^{N_t} R_{\ell,k} z_{i,k}^{(n)} \right|^2, \quad (6)$$

A partial candidate of the nth layer $z_i^{(n)}$ may be called a child of a partial candidate of the (n+1)st layer $z_l^{(n+1)}$ if and only if $z_i^{(n)} = [z_{i,n}^{(n)}, (z_l^{(n+1)})^T]^T$, $z_{i,n}^{(n)} \in Z$ holds.

TABLE 2

A general description of complex LR-aided K-best detectors.

Input: Channel matrix $H^c$, received signal vector $y^c$, candidate size K
Output: Hard-output estimate $\hat{s}^c$
(1) Obtain $\overline{H}^c$ and $\overline{y}^c$
(2) $[\tilde{H}^c, T^c] = LR(\overline{H}^c)$
(3) $[Q^c, R^c] = QR(\tilde{H}^c)$
(4) $\check{y}^c = (Q^c)^H(\overline{y}^c - \overline{H}^c 1_{N_t \times 1}(1+j))/2$
(5) $z_1^{c(N_t+1)} = [\ ], cost_1^{c(N_t+1)} = 0$, len = 1
(6) For n = $N_t$ down to 1
(7) $[\{z_k^{c(n)}\}_{k=1}^{K}, \{cost_k^{(n)}\}_{k=1}^{K}] =$
    Find_Kbest_Children $(\{z_k^{c(n+1)}\}_{k=1}^{len}, \{cost_k^{(n+1)}\}_{k=1}^{len})$
(8) len = K
(9) End for
(10) Output $\hat{s} = Q(2Tz_k^{c(1)} + (1+j)1_{N_t \times 1})$ Compared to the real signal processing, directly processing the signal in complex domain has several benefits such as lower number of arithmetic operations and lower latency. In contrast to the real LR-aided K-best detector in Table 1, which has $2N_t$ layers, the complex LR-aided K-best detector may have $N_t$ layers. As such, the complex LR-aided K-best detector may yield lower latency and resources compared to the real counterparts.

1.3 Problems with Conventional LR-Aided K-Best Detectors

Figure 2:
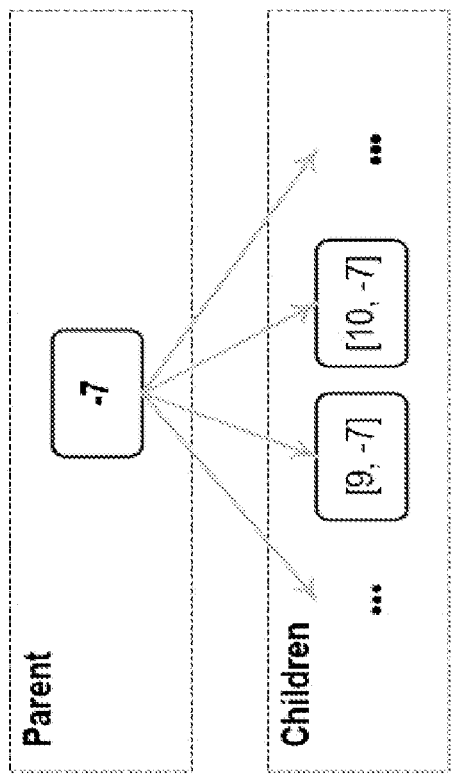
FIG. 2 illustrates broader range and infinite children of LR-aided K-best compared to the conventional K-best with 4PAM.
Figure 2:
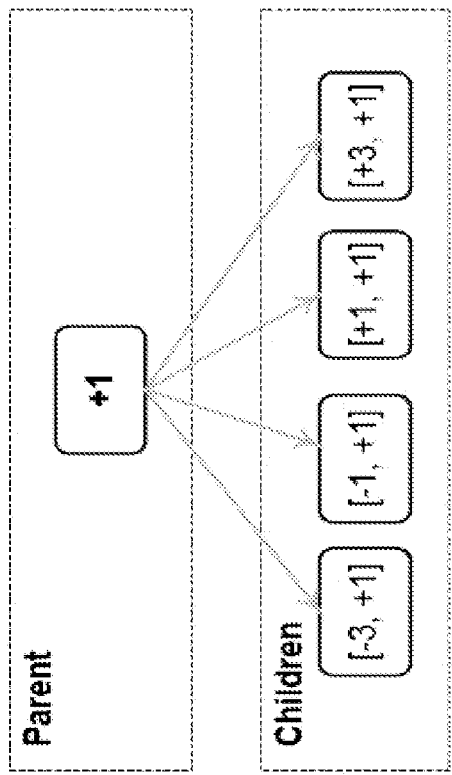

However, different from the K-best algorithm in s-domain, in which the number of children is finite due to the bounded constellation set S, each partial candidate in the LR-aided K-best algorithm has infinite possible children because no information about the boundary of Z is available. FIG. 2 illustrates a comparison of the broader range and infinite children of LR-aided K-best compared to the conventional K-best with 4PAM. As illustrated in FIG. 2, unlike the partial candidates in existing K-best algorithm, which are in the bounded constellation set S, the range of the partial candidates in the LR domain $z_i^{(n)}$ is broader and is generally undetermined. As shown in FIG. 2, each partial candidate in the LR-aided K-best algorithm may have infinite possible children because no information about the boundary of z is available, while the number of children of K-best algorithm is finite due to the bounded constellation set S.

These differences pose several new challenges on LR-aided K-best in hardware implementation. Wider range of candidates requires higher fixed-point resolution to represent $z_i^{(n)}$ and more resources to compute the arithmetic operations related to $z_i^{(n)}$. In addition, how to efficiently find the top K children among the infinite children becomes a critical task.

In the existing technologies, a pre-expansion method is known to address the infinite children issue. The pre-expansion method is as described in Qi. The pre-expansion method first finds top K children of each parent. For instance, the pre-expansion method approximates the infinite children set with a finite set with NK children by expanding only N best children for each partial candidate of the (n+1)st layer. Next, the algorithm then chooses the top K partial candidates for the nth layer from the NK children. Note that, when N=K, the $K^2$ children themselves contain at least K best partial candidates among all the children of the (n+1)st layer, and thus, the pre-expansion method is an exact one. The complexity of this method is on the order of $O(N_t K + K^2)$. When K is large, the complexity of the pre-expansion method becomes high, and thus its hardware implementation becomes infeasible.

Further, in the existing technologies, an on-demand expansion method is also known to further reduce the number of node/child expansions. Discussions of the on-demand expansion method may be found in Shabany. The on-demand expansion method employs the Schnorr-Euchner (SE) strategy to perform an on-demand child expansion. This method maintains a candidate list with size K that stores the current best child of each parent, where the current best child is defined as the child that all its better siblings of the same parent are already chosen as the partial candidates of the nth layer. Then, the on-demand expansion method chooses the best child in the candidate list and replaces the best child with its next best sibling of the same parent via SE expansion. As such, a child is expanded if only if all its better siblings are expanded. After K selections, the best K children of the layer can be obtained. The main benefit of the on-demand child expansion is that, the method expands 2K−1 children for each layer, and thus requires much less resources to compute and store the 2K children compared to the pre-expansion method in Qi, which expands $K^2$ children. Although significant reduction on the node expansions is achieved in Shabany, the method in Shabany uses a brute-force method to find a child with the minimum cost in the candidate list, and as a consequence, the complexity is still on the order of $O(N_tK+K^2)$.

Further, the complex LR-aided K-best detectors have a main difficulty to efficiently find the best K children of each layer in complex domain, which is more complicated than that in real domain.

2. Improved LR-Aided K-Best Detectors

One aspect of the disclosed technology relates to reducing the complexity of the existing designs on computing K best children among all the children for each layer. For instance, the disclosed technology may reduce the complexity of finding the K best partial candidates from the infinite children set for each layer by exploiting an on-demand child expansion and a priority queue.

2.1 Real LR-Aided K-Best Detectors

According to one embodiment of the disclosed technology, the MIMO symbol detector 110 may include a real LR-aided K-best detector. The real LR-aided K-best detector may exploit the on-demand child expansion and a priority queue. Table 3 provides an example pseudo code of the real LR-aided K-best detector. Compared to the algorithm in Shabany, the algorithm according to this embodiment employs the priority queue, instead of a brute-force method in Shabany, to find a child with the minimum cost in line 10. The priority queue may be implemented by a heap, which requires O(1) operations to find the child with the minimum cost, $O(\log_2(K))$ operations to maintain the heap if a key is changed (line 17), and O(K) operations to initialize the heap with K elements (line 8). Thus, the overall complexity of the method described in Table 3 may be $O(N_tK+K \log_2(K))$, which is considerably lower than $O(N_tK+K^2)$ in Qi and Shabany when K is large. The complexity of lines 4 and 11 may generally rely on the data structure of the implementation and may be at most on the order $O(N_t)$ by using a memory copy method. The procedure presented in Table 3 may find the exact K best partial candidates for each layer with reduced complexity.

TABLE 3

Find_Kbest_Children( ) subroutine for the real LR-aided K-best detector.

Input: len partial candidates of the (n + 1) st layer $\{z_k^{(n+1)}\}_{k=1}^{len}$ with their costs $\{cost_k^{(n+1)}\}_{k=1}^{len}$
Output: K partial candidates of the nth layer $\{z_k^{(n)}\}_{k=1}^{K}$ with their costs $\{cost_k^{(n)}\}_{k=1}^{K}$

| Line no. | Description | Complexity |
|---|---|---|
| (1) | For i = 1 to len | |
| (2) | $r_i = \tilde{y}_n - \Sigma_{l=n+1}^{N} R_{n,l} z_{i,l}^{(n+1)}$ | $O(N_t)$ |
| (3) | $z_i = \lfloor r_i/R_{n,n} \rceil$ | O(1) |
| (4) | $child_i = [z_i, (z_i^{(n+1)})^T]^T$ | O(1) or $O(N_t)$ |
| (5) | $childcost_i = cost_i^{(n+1)} + (r_i - R_{n,n}z_i)^2$ | O(1) |
| (6) | $step_i = sgn(r_i/R_{n,n} - z_i)$ | O(1) |
| (7) | End for | |
| (8) | Initialize a priority queue q with $\{childcost_i\}_{i=1}^{len}$ as the keys | O(K) |
| (9) | For k = 1 to K | |
| (10) | Find the index i associated with the minimum key in q | O(1) |
| (11) | $z_k^{(n)} = child_i$ | O(1) or $O(N_t)$ |
| (12) | $cost_k^{(n)} = childcost_i$ | O(1) |
| (13) | $z_i = z_i + step_i$ | O(1) |
| (14) | $child_i = [z_i, (z_i^{(n+1)})^T]^T$ | O(1) |
| (15) | $childcost_i = cost_i^{(n+1)} + (r_i - R_{n,n}z_i)^2$ | O(1) |
| (16) | $step_i = -step_i - sgn(step_i)$ | O(1) |
| (17) | Update q using $childcost_i$ as the new key | $O(\log_2(K))$ |
| (18) | End for | |
| (19) | Output $\{z_k^{(n)}\}_{k=1}^{K}, \{cost_k^{(n)}\}_{k=1}^{K}$ | |

The low complexity of the LR-aided K-best algorithm may perform the algorithm for large MIMO systems (e.g., 50×50 MIMO systems) with large candidate sizes. As the number of antennas increases, the error performance may approach that of AWGN channel. In one embodiment of the disclosed technology, the LR-aided K-best algorithm may be combined with the minimum-mean-square-error (MMSE) regularization to achieve near-optimal error performance for large MIMO systems with large constellation sizes (e.g., 50×50 MIMO with 256-QAM).

2.2 Complex LR-Aided K-Best Detectors

In another aspect of the disclosed technology, the MIMO symbol detector 110 may include a complex LR-aided K-best detector. The disclosed technology may reduce the complexity of the existing designs on computing K best children among all the children for each layer.

2.2.1 Finding the Best K Children with 2D SE Expansion

According to one embodiment of the disclosed technology, a complex LR-aided K-best detector may efficiently find the best K children of each layer in complex domain by using 2-dimensional (2D) Schnorr-Euchner (SE) expansion.

Table 4 illustrates one example method to find the best K children with 2D SE expansion. Similar to the real LR-aided K-best detector illustrated in Table 3, the LR-aided complex K-best detector according to this embodiment may exploit an on-demand child expansion and a priority queue.

(K)) by exploiting the on-demand child expansion and a priority queue. Compared to the existing technology described in Shabany, the proposed algorithm may employ a priority queue, instead of a brute-force method described in Shabany, to find a child with the minimum cost in line 12.

TABLE 4

The proposed Find_Kbest_Children( ) subroutine with 2D SE expansion for the complex LR-aided K-best detector.

Input: len partial candidates of the (n + 1) st layer $\{z_k^{c(n+1)}\}_{k=1}^{len}$ with their costs $\{cost_k^{(n+1)}\}_{k=1}^{len}$
Output: K partial candidates of the nth layer $\{z_k^{c(n)}\}_{k=1}^{K}$ with their costs $\{cost_k^{(n)}\}_{k=1}^{K}$

| Line no. | Description | Complexity |
|---|---|---|
| (1) | For i = 1 to len | |
| (2) | $r_i^c = \tilde{y}_n^c - \Sigma_{l=n+1}^{N} R_{n,l}^c z_{i,l}^{c(n+1)}$ | O(N) |
| (3) | $z_i^c = \lceil r_i^c / R_{n,n}^c \rfloor$ | O(1) |
| (4) | $child_i = [z_i^c, (z_i^{c(n+1)})^T]^T$ | O(1) or O(N) |
| (5) | $parent_i = i$ | O(1) |
| (6) | $childcost_i = cost_i^{(n+1)} + \| r_i^c - R_{n,n}^c z_i^c \|^2$ | O(1) |
| (7) | $step_i = sgn(r_i^c / R_{n,n}^c - z_i^c)$ | O(1) |
| (8) | $twosiblings_i = true$ | O(1) |
| (9) | End for | |
| (10) | Initialize a priority queue q with $\{childcost_i\}_{i=1}^{len}$ as the keys | O(K) |
| (11) | For k = 1 to K | |
| (12) | Find the index i associated with the minimum key in q | O(1) |
| (13) | If $twosiblings_i$ then | O(1) |
| (14) | len = len + 1 | O(1) |
| (15) | $r_{len}^c = r_i^c$ | O(1) |
| (16) | $parent_{len} = parent_i$ | O(1) |
| (17) | $\Re[z_{len}^c] = \Re[z_i^c] + \Re[step_i]$ | O(1) |
| (18) | $\Im[z_{len}^c] = \Im[z_i^c]$ | O(1) |
| (19) | $child_{len} = [z_{len}^c, (z_{parent_{len}}^{c(n+1)})^T]^T$ | O(1) or O(N) |
| (20) | $childcost_{len} = cost_{parent_{len}}^{(n+1)} + \| r_{len}^c - R_{n,n}^c z_{len}^c \|^2$ | O(1) |
| (21) | $\Re[step_{len}] = -\Re[step_{len}] - sgn(\Re[step_{len}])$ | O(1) |
| (22) | $\Im[step_{len}] = \Im[step_{len}]$ | O(1) |
| (23) | $twosiblings_{len} = true$ | O(1) |
| (24) | Update q by adding the key $childcost_{len}$ | $O(\log_2(K))$ |
| (25) | End if | |
| (26) | $z_k^{c(n)} = child_i$ | O(1) or O(N) |
| (27) | $cost_k^{(n)} = childcost_i$ | O(1) |
| (28) | $\Im[z_i^c] = \Im[z_i^c] + \Im[step_i]$ | O(1) |
| (29) | $child_i = [z_i^c, (z_{parent_i}^{c(n+1)})^T]^T$ | O(1) |
| (30) | $childcost_i = cost_{parent_i}^{(n+1)} + \| r_i^c - R_{n,n}^c z_i^c \|^2$ | O(1) |
| (31) | $\Im[step_i] = -\Im[step_i] - sgn(\Im[step_i])$ | O(1) |
| (32) | $twosiblings_i = false$ | O(1) |
| (33) | Update q using $childcost_i$ as the new key | $O(\log_2(K))$ |
| (34) | End for | |
| (35) | Output $\{z_k^{c(n)}\}_{k=1}^{K}, \{cost_k^{(n)}\}_{k=1}^{K}$ | |

This method may classify all children into two categories and expands the next children via the real and/or imaginary direction depending on the categories to make sure the next smallest child of the same parent is in the candidate list. For example, with continued reference to Table 4, a child, e.g., $z_i^{(n)}$, of a parent $z_l^{(n+1)}$ in the nth layer may be classified as two categories. In a first category (i.e., Type I), the real part of $z_{i,n}^{(n)}$ of the child $z_i^{(n)}$ may be the same as the real part of $z_{k,n}^{(n)}$, where $z_k^{(n+1)}$ may be the child with the lowest cost among all the children of the same parent $z_l^{(n+1)}$. The second category (i.e., Type II) may include all other scenarios that do not fit in the first category.

Once a Type I child is chosen as one of the K-best children, both the real (lines 13-24 in Table 4) and imaginary SE (lines 28-33 in Table 4) expansions may be executed to guarantee that the next smallest child of the same parent is in the priority queue. However, for a Type II child, only imaginary SE expansion may be performed (lines 28-33 in Table 4). Note the rounding operation $\lceil \cdot \rfloor$ may round the real and imaginary parts of a complex variable, respectively.

The algorithm in Table 4 may find the exact K best partial candidates for each layer with complexity O(NK+K $\log_2$ (K)) by exploiting the on-demand child expansion and a priority queue. The priority queue may be implemented by a heap, which may require O(1) operations to find the child with the minimum cost, $O(\log_2(K))$ operations to maintain the heap if a key is changed (lines 24, 33, note that the size of the heap is, at most, 2K), and O(K) operations to initialize the heap with K elements (line 10). Thus, the overall complexity of the proposed method may be $O(NK+K \log_2(K))$, which is considerably lower than $O(NK+K^2)$ in Shabany and Qi when K is large. Note that, the complexity of lines 4, 19, and 26 may generally rely on the data structure of the implementation and is at most on the order O(N) by using a memory copy method.

2.2.2 Finding the Best K Children with Two-Stage 1D SE Expansion

According to another embodiment of the disclosed technology, a complex LR-aided K-best detector may efficiently find the best K children of each layer in complex domain by a two-stage one-dimensional (1D) SE expansion. The two-stage expansion method may be based on the one-dimensional expansion described in Table 3, where the 1D SE expansion may be the same as the one that used in real LR-aided K-best in Table 3 (lines 15-16). Table 5 illustrates an example method to find the best K children with two-stage 1D SE expansion.

TABLE 5

The proposed Find_Kbest_Children( ) subroutine with two-stage 1D SE expansion for the complex LR-aided K-best detector.

Input: len partial candidates of the (n + 1) st layer $\{z_k^{c^{(n+1)}}\}_{k=1}^{len}$ with their costs $\{cost_k^{(n+1)}\}_{k=1}^{len}$
Output: K partial candidates of the nth layer $\{z_k^{c^{(n)}}\}_{k=1}^{K}$ with their costs $\{cost_k^{(n)}\}_{k=1}^{K}$

| Line no. | Description | Complexity |
|---|---|---|
| (1) | For i = 1 to len | |
| (2) | $r_i^c = \tilde{y}_n^c - \sum_{l=n+1}^{N_t} R_{n,l}^c z_{i,l}^{(n+1)}$ | $O(N_t)$ |
| (3) | $z_i^c = \lceil r_i^c / R_{n,n}^c \rfloor$ | $O(1)$ |
| (4) | $child_i = [z_i^c, (z_i^{c(n+1)})^T]^T$ | $O(1)$ or $O(N_t)$ |
| (5) | $childcost_i = cost_i^{(n+1)} + \mid r_i^c - R_{n,n}^c z_i \mid^2$ | $O(1)$ |
| (6) | $step_i = sgn(r_i^c / R_{n,n}^c - z_i^c)$ | $O(1)$ |
| (7) | End for | |
| (8) | Initialize a priority queue q with $\{childcost_i\}_{i=1}^{len}$ as the keys | $O(K)$ |
| (9) | For k = 1 to K | |
| (10) | Find the index i associated with the minimum key in q | $O(1)$ |
| (11) | $newchild_k = child_i$ | $O(1)$ or $O(N_t)$ |
| (12) | $newchildcost_k = childcost_i$ | $O(1)$ |
| (13) | $newcost_k = cost_i^{(n+1)}$ | $O(1)$ |
| (14) | $newstep_k = step_i$ | $O(1)$ |
| (15) | $newr_k = r_i^c$ | $O(1)$ |
| (16) | $z_i^c = z_i^c + \Im[step_i]$ | $O(1)$ |
| (17) | $child_i = [z_i^c, (z_i^{c(n+1)})^T]^T$ | $O(1)$ |
| (18) | $childcost_i = cost_i^{(n+1)} + \mid r_i^c - R_{n,n}^c z_i^c \mid^2$ | $O(1)$ |
| (19) | $step_i = -\Im[step_i] - sng(\Im[step_i]) + \Im[step_i]j$ | $O(1)$ |
| (20) | Update q using $childcost_i$ as the new key | $O(\log_2(K))$ |
| (21) | End for | |
| (22) | Initialize a priority queue q with $\{newchildcost_i\}_{i=1}^{K}$ as the keys | $O(0)$ |
| (23) | For k = 1 to K | |
| (24) | Find the index i associated with the minimum key in q | $O(1)$ |
| (25) | $z_k^{c^{(n)}} = newchild_i$ | $O(1)$ or $O(N_t)$ |
| (26) | $cost_k^{(n)} = newchildcost_i$ | $O(1)$ |
| (27) | $[z_i^c, z_i^{c^T}]^T = newchild_i$ | $O(1)$ |
| (28) | $z_i^c = z_i^c + \Im[newstep_i]j$ | $O(1)$ |
| (29) | $newchild_i = [z_i^c, z_i^{c^T}]^T$ | $O(1)$ |
| (30) | $newchildcost_i = newcost_i + \mid newr_i - R_{n,n}^c z_i^c \mid^2$ | $O(1)$ |
| (31) | $newstep_i = (-\Im[n]wstep_i] - sgn(\Im[newstep_i]))j$ | $O(1)$ |
| (32) | Update q using $newchildcost_i$ as the new key | $O(\log_2(K))$ |
| (33) | End for | |
| (34) | Output $\{z_k^{c^{(n)}}\}_{k=1}^{K}, \{cost_k^{(n)}\}_{k=1}^{K}$ | |

As illustrated in Table 5, the first stage may expand only the real parts of all the children of the $(n+1)^{st}$ layer. After K expansions, the second stage may expand only the imaginary parts of all the children obtained from the first stage. Since the children obtained from the first stage and their siblings obtained by the following imaginary-part expansion may contain the top K children of the layer, this method may be an exact one and may not rely on the 2D SE method. Lines 1-18 in Table 5 may be similar to Table 4 except that some extra variables may be created to support the second-stage expansion.

Compared to the real LR-aided K-best that may have $2N_t$ layers in Tables 1 and 2, the complex LR-aided K-best according to this embodiment using the method in Table 5 may have $N_t$ layers. As such, this embodiment may thus save half of the best child calculation of each parent (lines 1-7 in Tables 1 and 5). As a result, the complex LR-aided K-best according to this embodiment may enjoy lower latency and complexity compared to the real one.

2.3 Performance of Improved LR-Aided K-Best Detectors

To demonstrate the performance of the improved LR-aided K-best algorithm for MIMO systems, a real LLL algorithm and a complex LLL algorithm with reduction quality parameter δ=1 or δ=0.99 may be adopted.

Figure 3:
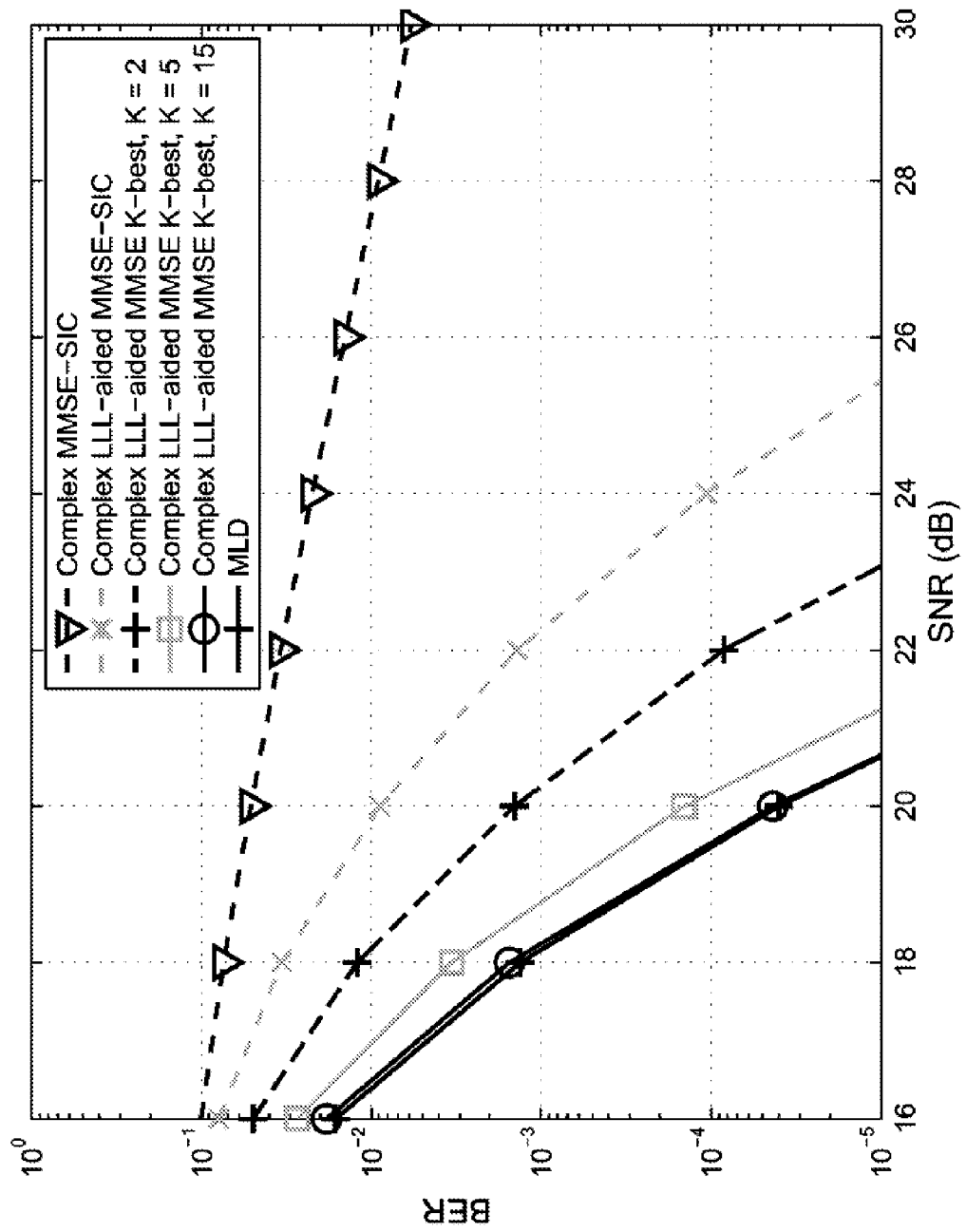
FIG. 3 illustrates performance comparisons of a complex LLL-aided MMSE K-best detector for a 10×10 MIMO system with 64QAM and different K.

FIG. 3 illustrates performance comparisons of various types of detectors including the complex LLL-aided MMSE K-best detector, the MLD, the complex MMSE successive interference cancelation (SIC), and the complex LLL-aided MMSE-SIC. These performance tests may be conducted on a 10×10 MIMO system with 64QAM and different K. Specifically, the entries of $H^c$ may be modeled as independent and identically distributed (i.i.d.) complex Gaussian variables with zero means and unit variances. The SNR shown in FIG. 3 may be defined as the received information bit energy versus noise variance. The BER shown in FIG. 3 may refer to bit-error rate.

As shown in FIG. 3, the complex LLL-aided MMSE-SIC may obtain significant performance improvement over the MMSE-SIC, whose diversity may be 1. The complex LLL-aided MMSE K-best detector may further enhance the performance of the complex LLL-aided MMSE-SIC, where the complex LLL-aided MMSE K-best detector with K=2 may have more than 2 dB gain over the complex LLL-aided MMSE-SIC. Also, as shown in FIG. 3, by increasing the number of candidates K, the performance of the complex LLL-aided MMSE K-best detector may approach that of the MLD. As shown in FIG. 3, when K=15, the complex LLL-aided MMSE K-best may achieve almost the same performance as the MLD.

Figure 4:
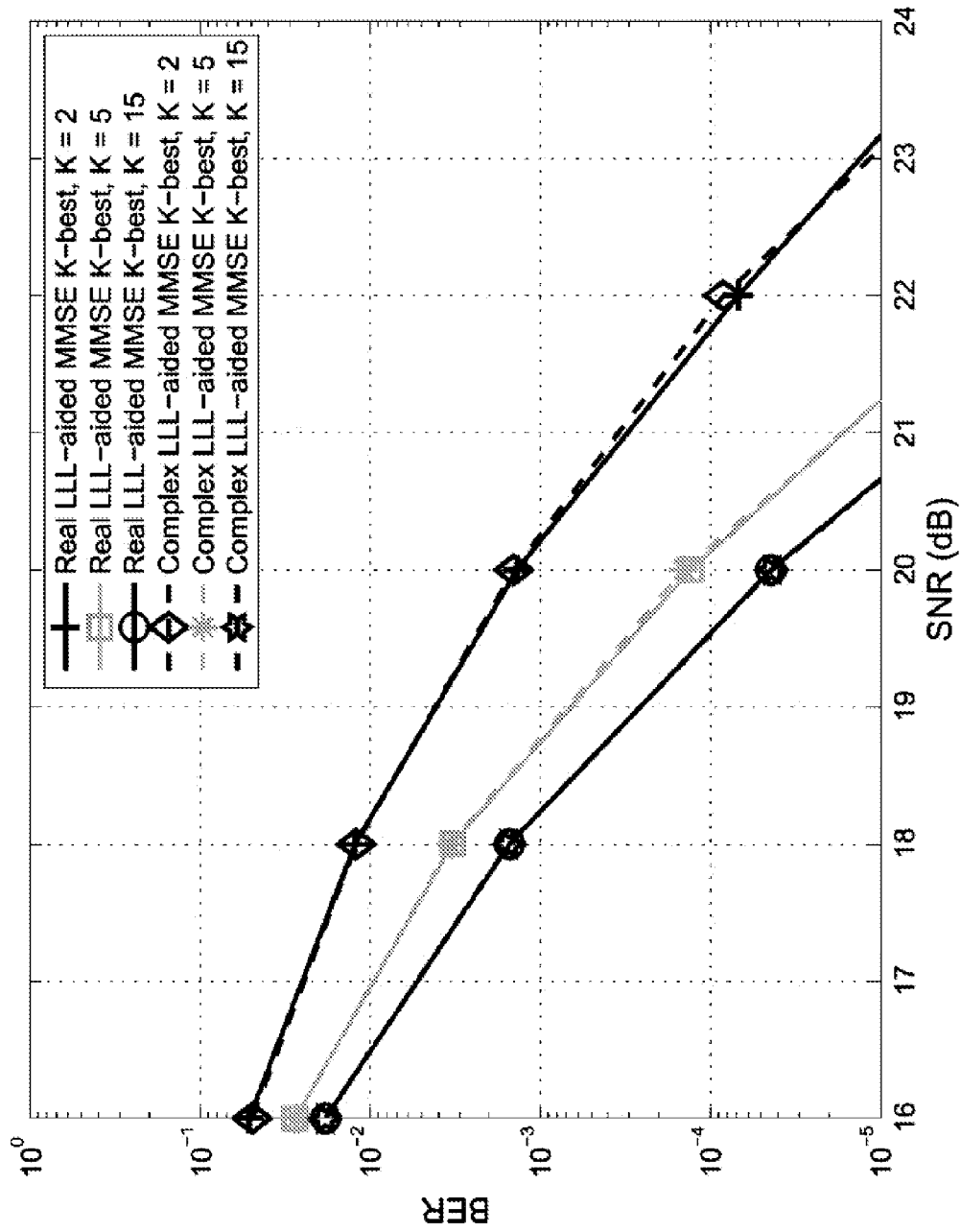
FIG. 4 illustrates performance comparisons of a real LLL-aided MMSE K-best detector and a complex LLL-aided MMSE K-best detector for a 10×10 MIMO system with 64QAM and different K.

FIG. 4 shows performance comparisons between the real LLL-aided MMSE K-best detector and the complex LLL-aided MMSE K-best detector for a 10×10 MIMO system with 64QAM and different numbers of K. As shown in FIG. 4, both the real and complex detectors may exhibit almost the same error performance for different K.

The improved real/complex LR-aided K-best algorithm according to the disclosed technology has a reduced complexity of $O(N_tK+K \log_2(K))$, which is lower than that of the existing technologies. The low complexity of the improved LR-aided K-best detectors may facilitate large-scale MIMO detection with large candidate sizes K. For example, the LR-aided K-best with K=4000 may achieve around 3 dB gap to the bound for 50×50 MIMO systems with 1024-QAM at bit-error rate (BER) being $10^{-5}$. With large number of K, the improved LR-aided K-best algorithm described herein may achieve near-optimal performance for large MIMO systems.

The complex LR-aided K-best detector may have lower latency than the real LR-aided K-best detector. Table 6 summarizes the average number of arithmetic operations (real additions and real multiplications for floating point) for the real LLL-aided MMSE K-best algorithm and the complex LLL-aided MMSE K-best algorithm described herein. The preprocessing steps (e.g., LLL and QR decomposition) do not count toward the table. Table 6 shows that the complex LLL-aided MMSE K-best algorithm generally requires fewer operations than the real one.

TABLE 6

Average number of arithmetic operations of the real LLL-aided MMSE K-best algorithm and the complex LLL-aided MMSE K-best algorithm.

| K | 2 | 5 | 10 | 15 |
|---|---|---|---|---|
| Real LLL-aided MMSE K-best, N = 10 | 1177.58 | 3133.31 | 6531.53 | 10046.05 |
| Complex LLL-aided MMSE K-best, N = 10 | 1172.08 | 2996.99 | 6169.82 | 9418.01 |

| K | 5 | 25 | 50 | 100 |
|---|---|---|---|---|
| Real LLL-aided MMSE K-best, N = 32 | 24274.92 | 127504.63 | 260720.92 | 533222.85 |
| Complex LLL-aided MMSE K-best, N = 32 | 23899.55 | 123125.56 | 249291.34 | 504265.87 |

2.4 Hardware Implementation

The hardware implementation of the disclosed technology may enjoy low complexity by taking account of the parallel hardware computation on the on-demand child expansion and the priority queue. In some embodiments, the complex LR-aided K-best detectors described herein may be easier to implement in hardware with potential lower latency and lower resources compared to their real counterparts.

In one embodiment, the large-scale MIMO systems may include at least 16 antennas at the transmitter and receiver, and use Xilinx VC707 FPGA evaluation board as target hardware platform for quick prototype. As the number of antennas goes large, the detector may consume more resources and yields longer latency, while the FPGA board has limited resources (e.g., registers and multipliers) and generally lower achievable frequency compared to ASIC.

To reduce the latency and resources, the pipeline stages of LR-aided K-best detector may be decreased by using the complex LR-aided K-best instead of the real one. The complex LR-aided K-best may have $N_t$ layers compared to $2N_t$ layers of the real one. As a result, the complex LR-aided K-best may potentially require fewer number of pipeline stages and thus less resources and lower latency.

In one aspect of the disclosed technology, the complex LR-aided K-best may be implemented on Xilinx FPGA for large-scale MIMO detection. To take into account of limited hardware resources offered by FPGA, a hardware-optimized complex LR-aided K-best detector may be proposed for relatively small K. The FPGA realization may support 3 Ghps MIMO transmission for 16×16 MIMO systems with 1024-QAM with about 2.7 dB gap to the MLD at hit-error rate (BER)=$10^{-4}$.

In some aspects of the disclosed technology, the greater value K is, the better performance is at the price of higher complexity. To decide the value of K with a good performance complexity tradeoff, the performance of the complex LLL-aided MMSE K-best detector for a 16×16 MIMO system with 1024-QAM may be conducted with respect to different values of K chosen from $\{1, \ldots, 10\}$. It is observed that as K increases, the performance gain decelerates, and the gain of K=10 compared to K=6 is about 0.5 dB at BER=$10^{-4}$, while the gain of K=6 over K=2 is more than 1.5 dB. As a result, K=6 may be chosen for implementation purposes.

Figure 5:
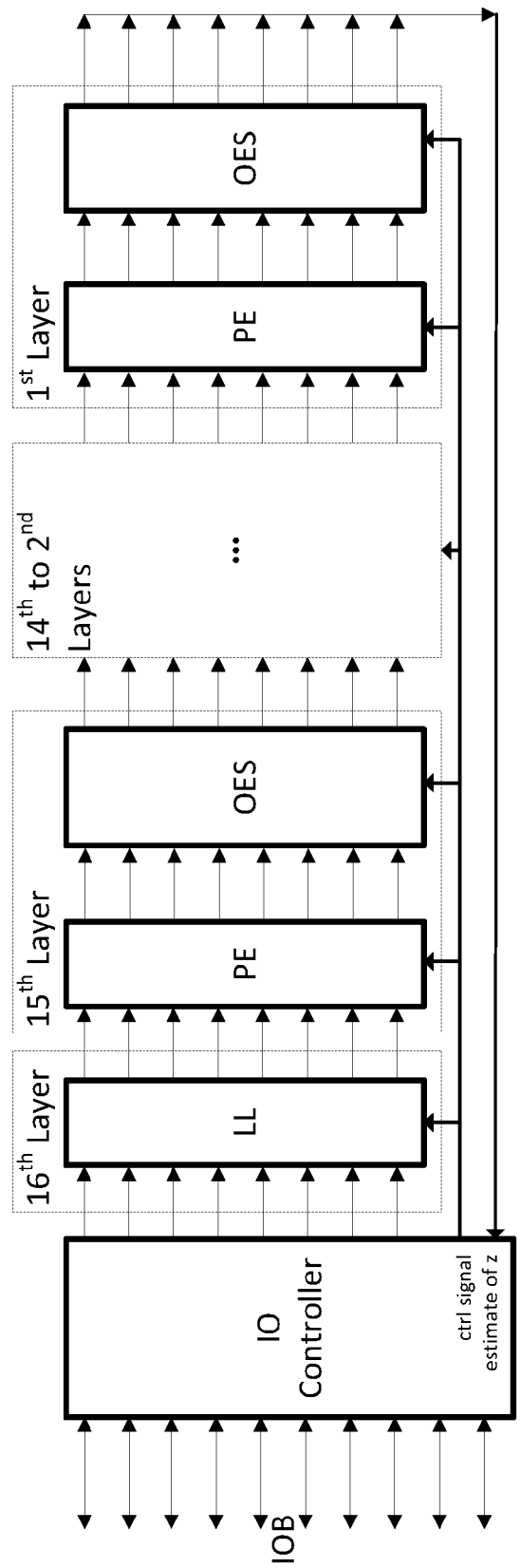
FIG. 5 illustrates a system diagram of an FPGA implementation of a LR-aided K-best detector for 16×16 MIMO systems.

FIG. 5 illustrates a system diagram of the hardware implementation of the MIMO symbol detector 110. Besides $\breve{y}^c$ and $R^c$, the implementation may require the input of $\{1/R_{i,i}^c\}_{i=1}^{N_t}$, that is assumed to be pre-computed before LR-aided K-best. As shown in FIG. 5, the MIMO symbol detector 110 may include a last layer (LL) module, a pre-expansion (PE) module, and an on-demand expansion and selection (OES) module. For K=6, the last layer (LL) module may generate the best 6 children of the $N_t$th layer. The LL module may accept new input $\breve{y}_{N_t}^c$, $R_{N_t,N_t}^c$ and $1/R_{N_t,N_t}^c$ for every 6 cycles. The LL module may output the best child of the layer in 3 cycles and the rest 5 children in total 8 cycles.

The PE module may generate the best 6 children of one parent of a specific layer. The PE module may be fully pipelined such that it accepts one parent in one cycle and outputs the children of one parent in 6 cycles.

The OES module may choose the best 6 children of a specific layer. The OES module may accept new input for every 6 cycles, and may output the best child of the layer in 6 cycles and the rest 5 best children of the layer in total 11 cycles.

According to the embodiment illustrated in FIG. 5, the overall latency of the design may be 8+15×(6+6)=188 cycles.

The proposed design may be modeled using Verilog, and the fixed-point (FP) settings for some key parameters are listed in Table 7 (the FP setting is denoted as [a, b], where a is the number of integer bits including one sign bit if applicable, and b is the number of fractional bits). As shown in Table 7, although the conventional K-best detectors may require 5 bits to represent the real or imaginary part of a 1024-QAM symbol (with proper scaling and shifting), the LR-aided K-best detector according to the disclosed technology may utilize 10 bits, which is twice boarder.

TABLE 7

Fixed-point settings of the FPGA implementation.

| Variable | $\breve{y}^c$ | $R^C$ | $1/R_{i,i}^c$ | $z^C$ | cost |
|---|---|---|---|---|---|
| FP setting | [11, 10] | [4, 10] | [4, 10] | [10, 0] | [5, 10] |

The design may be synthesized using Xilinx XST, and may be placed and routed by Xilinx PAR. The used resources, maximum achievable frequency after place and route, latency, and throughput of the proposed LR-aided K-best implementation are summarized in Table 8. The design may occupy about 22043/75900≈29% slices and 702/2800≈25% multipliers of XC7VX485T-2FFG1761 FPGA device. The design may be easily extended for larger MIMO systems. For 1024-QAM, the maximum throughput for 16×16 MIMO systems may be $f_{max} \times \log_2(1024) \times N_t/K \approx 3$ Gbps.

TABLE 8

Implementation results of the LR-aided K-best detector for 16 × 16 MIMO systems.

| Design | 16 × 16 MIMO |
|---|---|
| Slices | 22043 |
| Multipliers (DS P48Eis) | 702 |
| Maximum frequency, $f_{max}$ | 120.351 MHz |
| Latency | 1.562 µs |
| Max. throughput (64-QAM) | 1925 Mbps |
| Max. throughput (256-QAM) | 2567 Mbps |
| Max. throughput (1024-QAM) | 3209 Mbps |

2.5 LR-Aided K-Best Detectors with Late Expansion Strategy

In some aspects of the disclosed technology, the LR-aided K-best detector may be implemented with a late expansion strategy. Table 9 illustrates an example Find_Kbest_Children_Late( ) subroutine for a real LR-aided K-best detector using a late expansion. Compared to the subroutine in Table 3 without the late expansion strategy, this embodiment may postpone the next best child expansion to the next k+1 loop. This late expansion may be in the favor of hardware implementation, since the operations of finding the kth best child and the late expansion may be executed in parallel.

The late expansion strategy may not be used when len=1, as no valid children is available for the next SE expansion when len=1.

The late expansion strategy may not guarantee to find the K best children corresponding to the K parents in each layer. However, the late expansion may guarantee to find $\lfloor K/2 \rfloor$ best children corresponding to the K parents in each layer.

The LR-aided K-best detector with late expansion (e.g., Find_Kbest_Children_Late( ) in Table 9) may statistically result in degraded performance compared to that without late expansion (e.g., Find_Kbest_Children( ) in Table 3). However, as shown later, the performance loss may be negligible when K is moderately large.

Depending on the hardware requirements, part of the operations in the late expansion may be moved to the current child expansion. An example of such variant is presented in Table 10. The performance of such variants may be the same as that in Table 9.

TABLE 9

Find_Kbest_Children_Late( ) subroutine for the LR-aided K-best algorithm with on-demand expansion and the late expansion strategy.

Input: len partial candidates of the (n + 1) st layer $\{z_k^{(n+1)}\}_{k=1}^{len}$ with their costs $\{cost_k^{(n+1)}\}_{k=1}^{len}$
Output: K partial candidates of the nth layer $\{z_k^{(n)}\}_{k=1}^{K}$ with their costs $\{cost_k^{(n)}\}_{k=1}^{K}$

| Line no. | Description | |
|---|---|---|
| (1) | For i = 1 to len | |
| (2) | $r_i = \breve{y}_n - \Sigma_{l=n+1}^{N} R_{n,l} z_{i,l}^{(n+1)}$ | |
| (3) | $z_i = \lceil r_i / R_{n,n} \rfloor$ | |
| (4) | $child_i = [z_i, (z_i^{(n+1)})^T]^T$ | Expand the best child for each parent |
| (5) | $childcost_i = cost_i^{(n+1)} + (r_i - R_{n,n} z_i)^2$ | |
| (6) | $step_i = sgn(r_i / R_{n,n} - z_i)$ | |
| (7) | End for | |
| (8) | For k = 1 to K | |
| (9) | Find the minimum $childcost_j$ in $\{childcost_l\}_{l=1}^{len}$ | |
| (10) | $z_k^{(n)} = child_j$ | Find the kth child |
| (11) | $cost_k^{(n)} = childcost_j$ | |
| (12) | If k ≠ 1 then | |
| (13) | $z_{prev\_i} = z_{prev\_i} + step_{prev\_i}$ | |
| (14) | $child_{prev\_i} = [z_{prev\_i}, (z_{prev\_i}^{(n+1)})^T]^T$ | |
| (15) | $childcost_{prev\_i} = cost_{prev\_i}^{(n+1)} + (r_{prev\_i} - R_{n,n} z_{prev\_i})^2$ | Late expand the next best child |
| (16) | $step_{prev\_i} = -step_{prev\_i} - sng(step_{prev\_i})$ | |
| (17) | End if | |
| (18) | $childcost_j = \infty$ | |
| (19) | prev_i = j | |
| (20) | End for | |
| (21) | Output $\{z_k^{(n)}\}_{k=1}^{K}, \{cost_k^{(n)}\}_{k=1}^{K}$ | |

TABLE 10

A variant of Find_Kbest_Children_Late( ) subroutine for the LR-aided
K-best algorithm with on-demand expansion and the late expansion strategy.

Input: len partial candidates of the (n + 1) st layer $\{z_k^{(n+1)}\}_{k=1}^{len}$ with their costs $\{cost_k^{(n+1)}\}_{k=1}^{len}$
Output: K partial candidates of the nth layer $\{z_k^{(n)}\}_{k=1}^{K}$ with their costs $\{cost_k^{(n)}\}_{k=1}^{K}$

| Line no. | Description | |
|---|---|---|
| (1) | For i = 1 to len | ⎫ |
| (2) | $r_i = \tilde{y}_n - \Sigma_{l=n+1}^{N} R_{n,l} z_{i,l}^{(n+1)}$ | |
| (3) | $z_i = \lceil r_i / R_{n,n} \rfloor$ | |
| (4) | $child_i = [z_i, (z_i^{(n+1)})^T]^T$ | Expand the best child for each parent |
| (5) | $childcost_i = cost_i^{(n+1)} + (r_i - R_{n,n} z_i)^2$ | |
| (6) | $step_i = sgn(r_i/R_{n,n} - z_i)$ | |
| (7) | End for | ⎭ |
| (8) | For k = 1 to K | |
| (9) |    Find the minimum $childcost_j$ in $\{childcost_l\}_{l=1}^{len}$ | ⎫ |
| (10) |    $z_k^{(n)} = child_j$ | Find the kth best child |
| (11) |    $cost_k^{(n)} = childcost_j$ | ⎭ |
| (12) |    $z_j = z_j + step_j$ | |
| | | Partially expand the next best child |
| (13) |    $step_j = -step_j - sng(step_j)$ | ⎫ |
| (14) |    If k ≠ 1 then | |
| (15) |       $child_{prev\_i} = [z_{prev\_i}, (z_{prev\_i}^{(n+1)})^T]^T$ | Late expand the next best child |
| (16) |       $childcost_{prev\_i}$ $= cost_{prev\_i}^{(n+1)} + (r_{prev\_i} - R_{n,n} z_{prev\_i})^2$ | |
| (17) |    End if | |
| (18) |    $childcost_j = \infty$ | |
| (19) |    prev_i = i | |
| (20) | End for | ⎭ |
| (21) | Output $\{z_k^{(n)}\}_{k=1}^{K}, \{cost_k^{(n)}\}_{k=1}^{K}$ | |

2.6 Performance Comparison with/without Late Expansion

The late expansion strategy for LR-aided K-best detectors may relieve the critical path issue of existing K-best detectors. As such, the late expansion strategy may yield higher maximum frequency and higher throughput.

Figure 6:
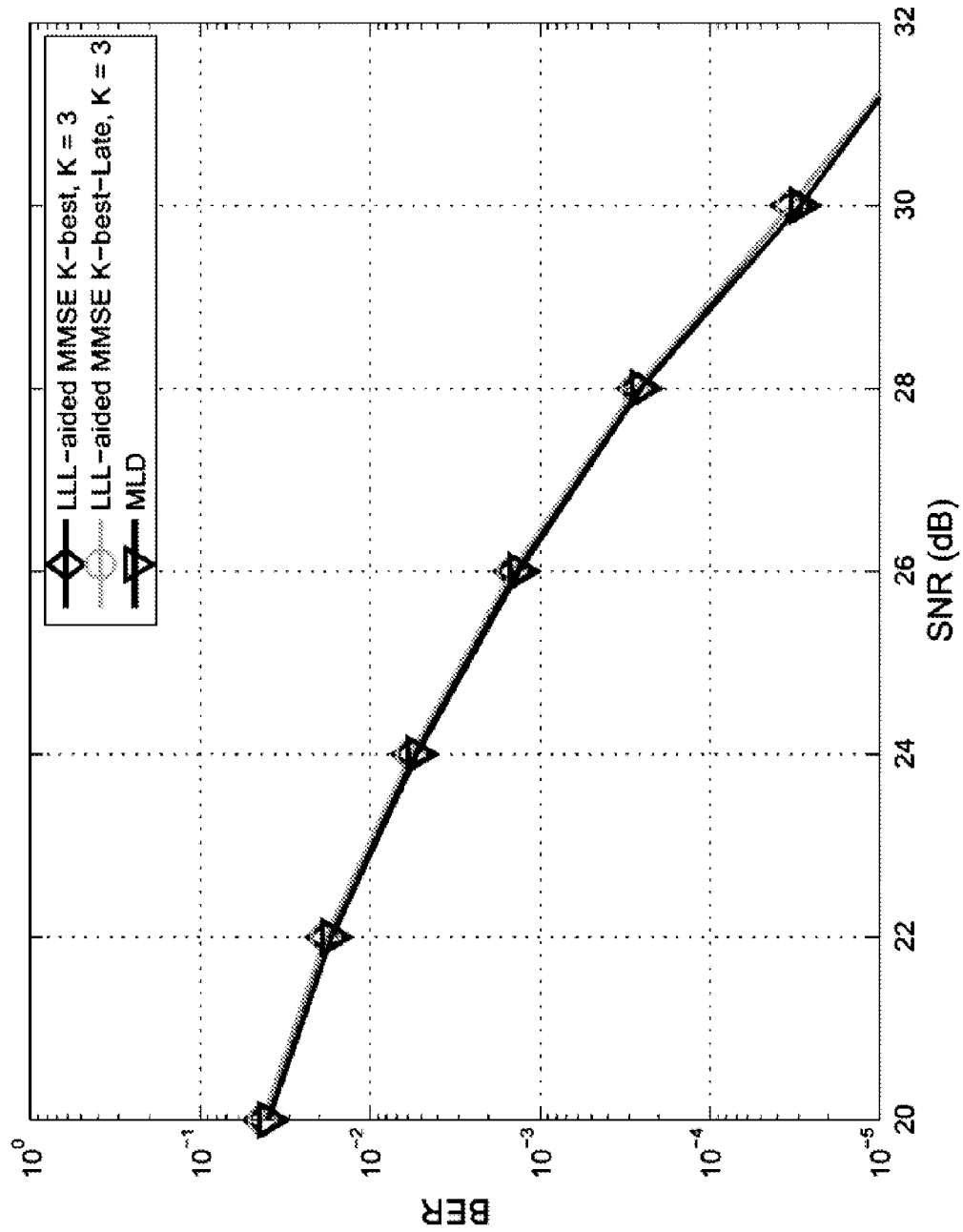
FIG. 6 illustrates performance comparisons of the MLD and LR-aided K-best without and with the late expansion strategy with 4×4 MIMO systems, 256-QAM, and K=3.

FIG. 6 displays the performance comparisons of the MLD, the LR-aided K-best without and with the late expansion strategy with 4×4 MIMO systems, 256-QAM, and K=3. The LR-aided K-best algorithm may adopt LLL algorithm and minimum mean square error (MMSE). The entries of H may be modeled as independent and identically distributed complex Gaussian variables with zero mean and unit variance. As illustrated in FIG. 6, with K=3, LR-aided K-best algorithms without and with the late expansion strategy may yield almost the same error performance as MLD.

Figure 7:
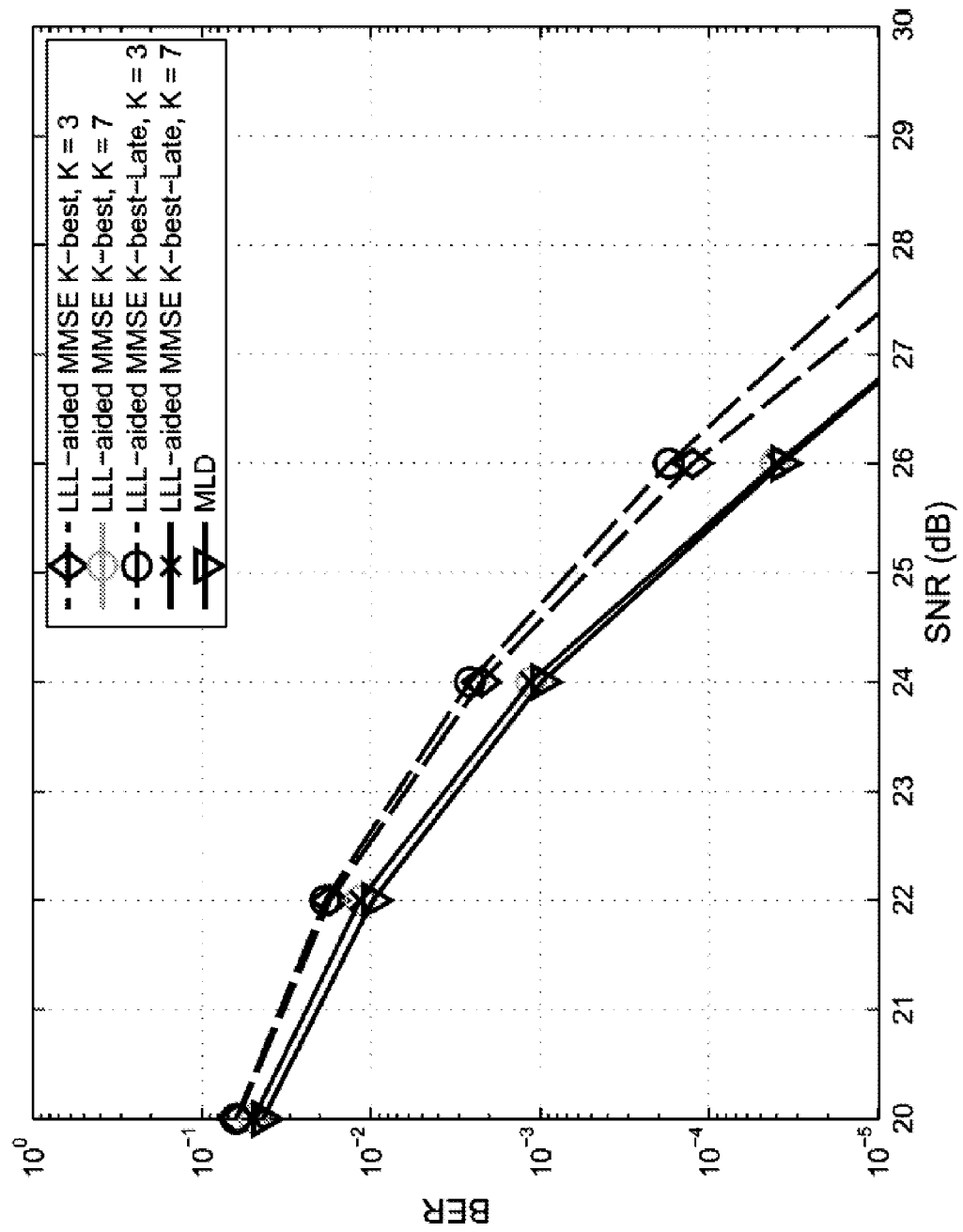
FIG. 7 illustrates performance comparisons of the MLD and LR-aided K-best without and with the late expansion strategy with 8×8 MIMO systems, 256-QAM, and K=3 and 7.
Figure 8:
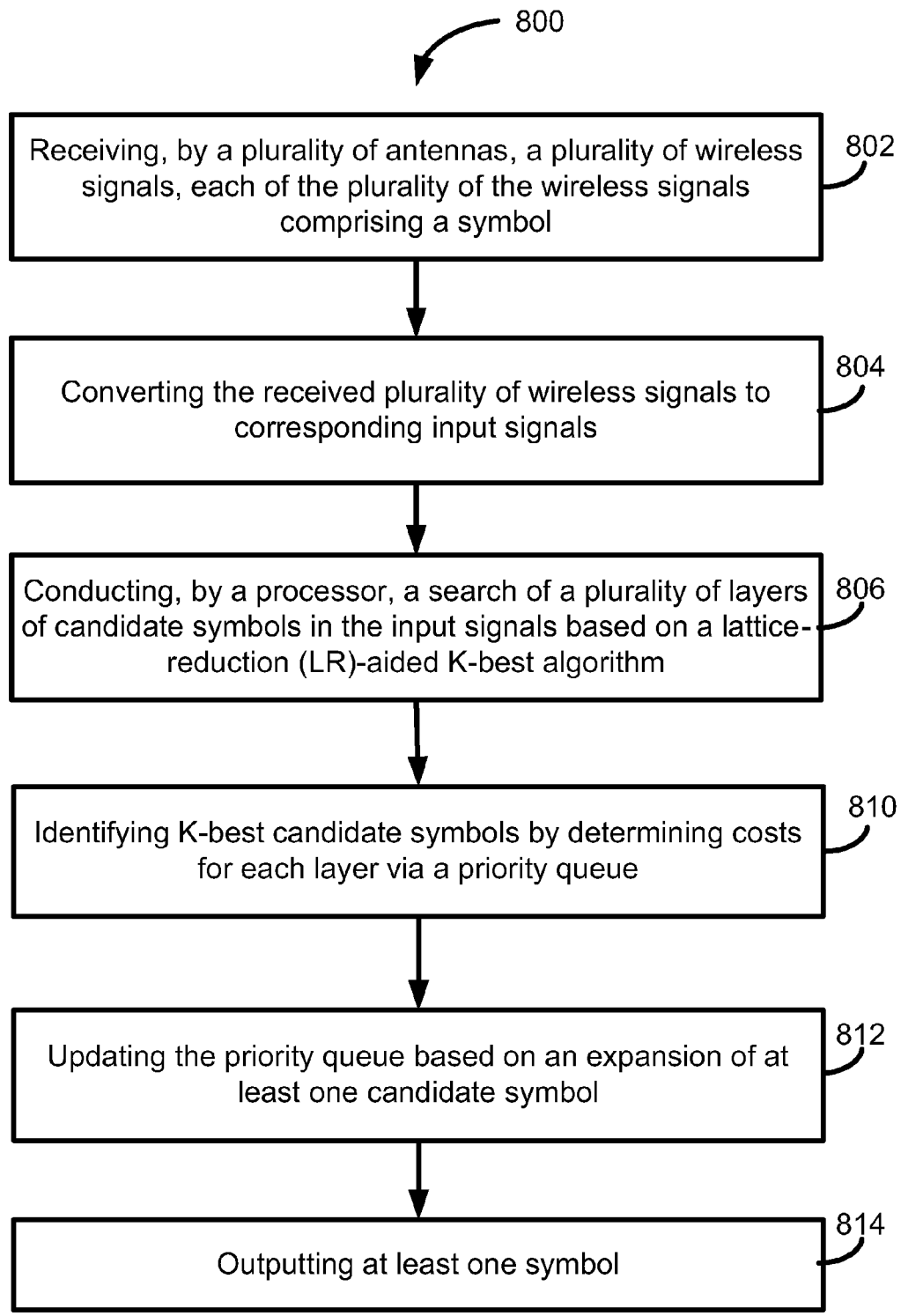
FIG. 8 is a flow diagram of a method according to an exemplary method of the disclosed technology.

FIG. 7 demonstrates the performance comparisons of the MLD, LR-aided K-best without and with the late expansion strategy with 8×8 MIMO systems, 256-QAM, and K=3 and 7. When K=3, the LR-aided K-best with the late expansion strategy may exhibit about 0.5 dB loss relative to that without the late expansion strategy at BER=$10^{-5}$, and the loss compared to MLD may be about 1 dB. When K=7, the MLD, and the LR-aided K-best without and with the late expansion strategy may exhibit almost the same error performance FIG. 8 is a flow diagram 800 of an example method in accordance with an exemplary embodiment of the disclosed technology. In block 802, the method 800 may receive, by a plurality of antennas, a plurality of wireless signals. Each of the plurality of the wireless signals may comprise a symbol. In block 804, the method 800 may convert the received plurality of wireless signals to corresponding input signals. In block 806, the method 800 may include conducting, by a processor, a search of a plurality of layers of candidate symbols in the input signals based on a lattice-reduction (LR)-aided K-best algorithm. In block 810, the method 800 may identify K best candidate symbols for each layer via a priority queue. In block 812, the method 800 may update the priority queue based on an expansion of at least one candidate symbol. In block 814, the method 800 may output at least one symbol.

In an example implementation, a value K associated with the K-best candidate symbols may be a predetermined number. In some examples, the K best candidate symbols may have minimum costs. In one example implementation, each layer may include at least one parent node representing a candidate symbol. In an example implementation, at least one parent node may include a child node. The child node may represent a candidate symbol. In one example implementation, the processor may perform an expansion on a best child node for each parent node. The best child node may have a minimum cost among all child nodes of the same parent node. In an example implementation, the processor may identify a kth best child node. The processor may expand a next best child node. In one example implementation, the processor may postpone the expansion of the next best child node.

In an example implementation, the expansion may be an on-demand expansion. In one example implementation, the expansion may be a Schnorr-Euchner (SE) expansion.

In an example implementation, the processor may implement the LR-aided K-best algorithm in a real domain. In one example implementation, the processor may implement the LR-aided K-best algorithm in a complex domain. In some examples, the LR-aided K-best algorithm may have a complexity of $O(NK+K \log_2(K))$, where N represents the number of antennas.

In an example implementation, the processor may perform a 2-dimensional SE expansion to identify the K best candidate symbols. In one example implementation, the 2-dimensional SE expansion may include a real SE expansion and an imaginary SE expansion. In another example implementation, the processor may perform a two-stage one-dimensional (1D) SE expansion. In one example implementation, the two-stage 1D SE expansion may include a first stage expansion on real parts of all child nodes of a layer, and a second stage expansion on imaginary parts of all child nodes obtained from the first stage.

Certain example implementations of the disclosed technology may provide a technical effect of reducing complexity and latency, and increasing throughput and performance associated with detectors in MIMO systems, such as large-scale MIMO systems. Further, technical effects provided by certain implementations of the disclosed technology may include a near-optimal error performance for MIMO systems with large constellation sizes. Still further, some implementations of the disclosed technology may provide technical effects of reducing implementation resources, such as reducing the number of pipeline stages, associated with detectors in MIMO systems.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims. For instance, the term "exemplary" used herein does not mean best mode, but rather, example.

Accordingly, those skilled in the art will appreciate that the conception upon which the application and claims are based may be readily utilized as a basis for the design of other structures, methods, and systems for carrying out the several purposes of the embodiments and claims disclosed in this application. It is important, therefore, that the claims be regarded as including such equivalent constructions.

Furthermore, the purpose of the foregoing Abstract is to enable the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

The invention claimed is:

1. A multiple-input multiple-output communication system, comprising:
    a plurality of antennas configured to receive a plurality of wireless signals; and
    a symbol detector configured to:
        convert the received wireless signals to input signals; and
        implement a lattice-reduction (LR)-aided K-best algorithm in a complex domain to detect a symbol in the input signals by:
            conducting a search of a plurality of layers of candidate symbols, wherein each layer includes at least one node representing a candidate symbol, wherein at least one node is a parent node that includes a child node;
            performing a 2-dimensional Schnorr-Enchner (SE) expansion to identify K-best candidate symbols for each of the plurality of layers, including:
                classifying all child nodes into a first category and a second category, wherein each child node in the first category has a real part identical to a real part of a best child node of the same parent node, wherein the best child node has a minimum cost among all child nodes of the same parent node, wherein each child node in the second category has a real part different from the real part of the best child node of the same parent node;
                performing the SE expansion in a real dimension and an imaginary dimension on child nodes in the first category;
                performing the SE expansion in the imaginary dimension on child nodes in the second category;
            implementing a priority queue to store the K-best candidate symbols for each of the plurality of layers; and
            updating the priority queue based on the 2-dimensional expansion.

2. The system of claim 1, wherein a value K associated with the K-best candidate symbols is a predetermined number.

3. The system of claim 1, wherein the K best candidate symbols have minimum costs.

4. The system of claim 1, wherein the symbol detector is further configured to perform an expansion on the best child node for each parent node, and wherein the symbol detector is further configured to identify a kth best child node and expand a next best child node.

5. The system of claim 4, wherein the symbol detector is further configured to postpone the expansion of the next best child node.

6. A method for symbol detection in a multiple-input multiple-output communication system, comprising:
    receiving, by a plurality of antennas, a plurality of wireless signals, each of the plurality of the wireless signals comprising a symbol;
    converting the received plurality of wireless signals to corresponding input signals;
    conducting, by a processor, a search of a plurality of layers of candidate symbols in the input signals based on a lattice-reduction (LR)-aided K-best algorithm in a complex domain, wherein each layer includes at least one node representing a candidate symbol, wherein at least one node is a parent node that includes a child node;
    identifying K-best candidate symbols for each layer by performing a 2-dimensional Schnorr-Euchner (SE) expansion, including:
        classifying all child nodes into a first category and a second category, wherein each child node in the first category has a real part identical to a real part of a best child node of the same parent node, wherein the best child node has a minimum cost among all child nodes of the same parent node, wherein each child node in the second category has a real part different from the real part of the best child node of the same parent node;
        performing the SE expansion in a real dimension and an imaginary dimension on child nodes in the first category;
        performing the SE expansion in the imaginary dimension on child nodes in the second catergory;
    implementing a priority queue to store the K-best candidate symbols for each layer; and
    updating the priority queue based on the 2-dimensional SE expansion; and
    outputting at least one symbol.

7. The method of claim 6, wherein a value K associated with the K-best candidate symbols is a predetermined number.

8. The method of claim 6, wherein the K best candidate symbols have minimum costs.

9. The method of claim 6, wherein the processor performs an expansion on the best child node for each parent node, and wherein the processor identifies a kth best child node and expands a next best child node.

10. The method of claim 9, wherein the processor postpones the expansion of the next best child node.

* * * * *